United States Patent [19]

Mackal

[11] Patent Number: 5,058,933
[45] Date of Patent: Oct. 22, 1991

[54] ROTATION AND RETRACTION-RESISTANT MANIFOLD HAVING INTEGRAL FLANGE

[76] Inventor: Glenn H. Mackal, 4923 59th Ave. S., St. Petersburg, Fla. 33715

[21] Appl. No.: 523,155

[22] Filed: May 14, 1990

[51] Int. Cl.⁵ .............................................. F16L 5/00
[52] U.S. Cl. .................................. 285/200; 285/284; 285/330; 156/293
[58] Field of Search .............. 285/284, 200, 305, 190, 285/423, 330, 328, 921, 149, 229; 137/223, 224, 224.5, 226, 227, 228, 229, 230, 231, 232, 233, 234, 234.5; 156/293

[56] References Cited

U.S. PATENT DOCUMENTS

| | | | |
|---|---|---|---|
| 712,738 | 11/1902 | Stevens | 285/190 |
| 2,273,398 | 2/1942 | Couty et al. | 285/149 |
| 2,779,061 | 1/1957 | Hosking | 285/200 X |
| 3,754,731 | 8/1973 | Mackal et al. | 285/216 X |
| 4,077,456 | 3/1978 | Smith | 137/223 X |
| 4,317,471 | 3/1982 | King | 285/921 X |
| 4,600,221 | 7/1986 | Bimba | 285/319 X |
| 4,812,193 | 3/1989 | Gauron | 156/293 |
| 4,903,997 | 2/1990 | Kifer | 285/284 |

FOREIGN PATENT DOCUMENTS

| | | | |
|---|---|---|---|
| 1964860 | 7/1970 | Fed. Rep. of Germany | 285/200 |
| 966722 | 8/1964 | United Kingdom | 285/921 |

Primary Examiner—Dave W. Arola
Attorney, Agent, or Firm—Joseph C. Mason, Jr.; Ronald E. Smith

[57] ABSTRACT

A manifold of the type used in connection with inflatable articles and an integral flange that holds the manifold against rotation and retraction in relation to an inflatable article. The flange extends radially from a first end of the manifold and completely circumscribes it. The first end of the manifold is embedded in a thickened part of the inflatable article. The embedding is accomplished by introducing flowable elastomeric material into a mold within which the first end of the manifold is pre-positioned. Plural apertures are formed about the circumferential extent of the flange, and the flowable elastomeric material flows into the apertures so that the flange is an integral part of the inflatable article when the elastomeric material solidifies. The manifold further includes a longitudinally extending groove, a transverse groove and a radial bore. Gas is channeled by the transverse groove to the longitudinal groove and by the latter groove to the radial bore, and the radial bore is confluent with a central passageway of the manifold that communicates with the interior of the inflatable article. The transverse groove compensates for rotational and axial misalignment between the radial bore and a bore formed in an inflator member that slidably receives the manifold.

8 Claims, 1 Drawing Sheet

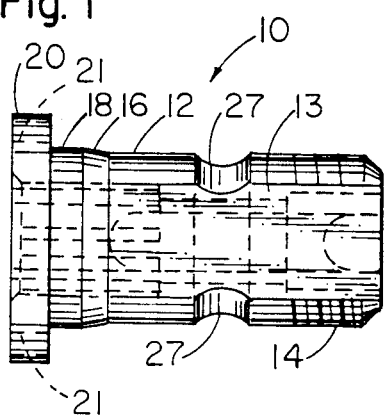
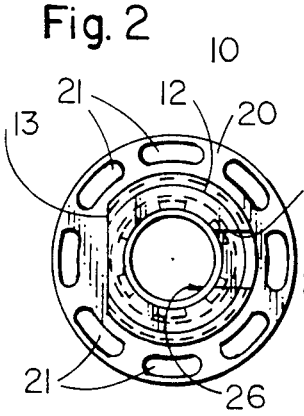
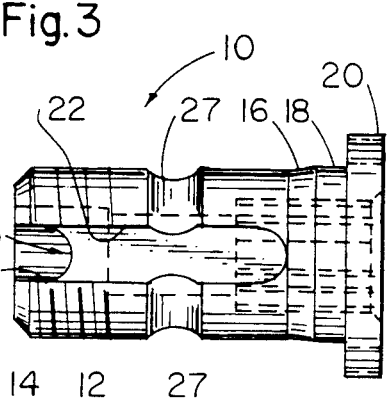
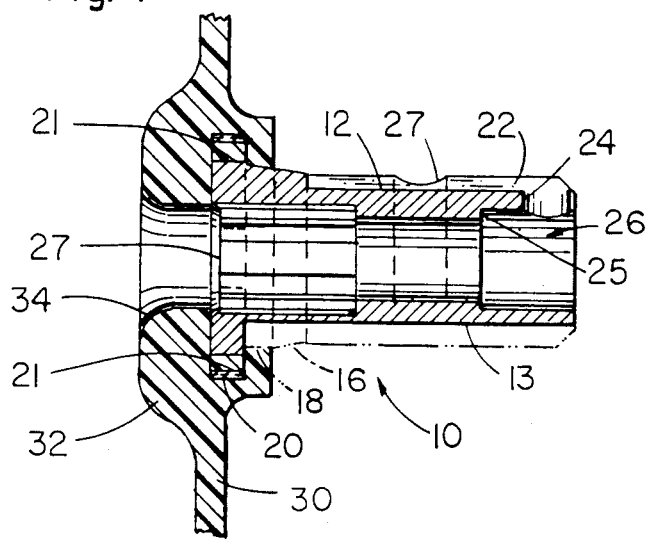
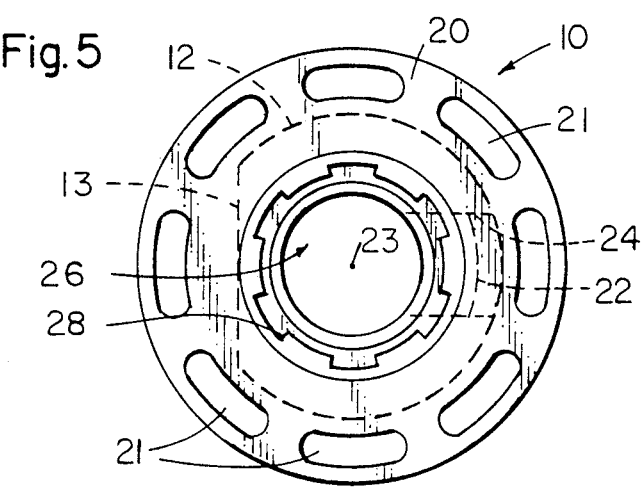

ROTATION AND RETRACTION-RESISTANT MANIFOLD HAVING INTEGRAL FLANGE

TECHNICAL FIELD

This invention relates, generally, to inflation manifolds of the type used in connection with inflatable articles such as life vests. More particularly, it relates to a manifold design wherein a first end thereof is embedded in a thickened wall of an inflatable article and wherein the embedded end is specially designed to defeat facile rotation and retraction of the manifold.

BACKGROUND ART

Devices that require rapid inflation, such as life vests, are typically inflated by gas contained in $CO_2$ cartridges that are carried in housings known as inflators. A typical inflator includes a pivotally mounted bell crank that is rotated about a pivot shaft when a lanyard secured to the crank is pulled; the rotation of the bell crank effects piercing of the gas cartridge. The inflatable article normally communicates with the inflator through an inflation valve or manifold which extends generally perpendicularly from an exterior surface of the article. Thus, when an inflator is connected to an inflation valve manifold, the bell crank thereof will lie in a plane perpendicular to the longitudinal axis of the manifold; accordingly, the inflation manifold will be subjected to rotational forces, or torque, when the lanyard is pulled. A component of longitudinally directed forces may also be present.

Some inflatable articles, such as life vests and life rafts, are repeatedly used for drill purposes. Military organizations, e.g., conduct large numbers of drills where inflatable rafts and vests are used. Moreover, airlines routinely purchase large quantities of life vests. Even in drill conditions, there are many situations where the inflatable article must not fail to inflate.

Many earlier designs have addressed the problem, but a manifold of simple construction that resists rotation and retraction even after repeated uses does not appear in the prior art.

The manifold designs of the prior art have another inadequacy which prior inventive efforts in this field have failed to resolve. Most manifolds have a flat formed therein that keys the manifold to the inflator, and a radial bore that aligns with a bore in the inflator through which gas flows. If the radial bore is formed in perfect diametric opposition to the flat, misalignment problems between the two bores will not arise. However, where design considerations or manufacturing mistakes produce a manifold bore that is not in perfect diametric opposition to the flat, misalignments occur; if the amount of misalignment is great, gases attempting to exit the inflator can be blocked and the desired rapid inflation of the inflatable article is not achieved. The prior art merely exhorts designers and manufacturers to unfailingly position the radial bore in precise diametric opposition to the flat.

Invention historians may consult U.S. Pat. No. 3,754,731 to Mackal et. al. for a further discussion of the prior art in this field.

DISCLOSURE OF INVENTION

An inflation manifold of the type having a first or proximal end embedded in a thickened wall of an inflatable article and a second or distal free end adapted to engage an inflator is improved by the addition of an integral, radially extending flange at its embedded end. Equidistantly and circumferentially spaced perforations or apertures, each of which preferably has an arcuate configuration, are formed about the entire circumferential extent of the flange; flowable elastomeric material enters into the interstitial spaces defined by the apertures and holds said flange against rotation and retraction, said elastomeric material being the same material from which the inflatable article is made.

The manifold has a longitudinally extending flat formed on a first side thereof, and a longitudinally extending groove formed on a diametrically opposite, second side thereof. A radially extending bore is formed in open communication with the groove, in diametric opposition to the flat, and with the edge of the distal free end of the manifold so that compressed gas is channeled by said groove into said bore and into the central passageway of the manifold which in turn leads to the internal cavity of the inflatable article.

A transverse groove intersects the longitudinally extending groove and encircles the manifold so that gas escaping from a penetrated cartridge can enter the longitudinally extending groove directly if the manifold and inflator are in rotational alignment and so that said gas may enter said transverse groove and be channeled to said longitudinally extending groove in the event of a rotational misalignment. Axial misalignment is compensated for by longitudinally extending the transverse groove.

Accordingly, this invention is new and useful. Moreover, it was not obvious to those of ordinary skill in this art at the time it was made, in view of the prior art, taken as a whole.

A general object of this invention is to advance the art of inflation manifolds of the type associated with inflatable articles.

A more specific object is to provide a rotation and retraction-resistant manifold of integral construction so that no assembly thereof is required.

Still another object is to provide a manifold that need not be in rotational or axial alignment with an inflator when in its operational configuration.

These and other important objects and advantages of the invention will become more apparent as this description proceeds.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which:

FIG. 1 is a side elevational view of the novel inflation manifold;

FIG. 2 is a first end elevational view thereof;

FIG. 3 is the opposite side elevational view of FIG. 1;

FIG. 4 is a longitudinal cross-sectional view of the manifold molded within a thickened part of an inflatable article; and FIG. 5 is an enlarged second end view opposite to that of FIG. 2.

Similar reference numerals refer to similar parts throughout the several views of the drawings.

BEST MODES FOR CARRYING OUT THE INVENTION

The unique inflation manifold of this invention is generally designated 10 in FIG. 1 and other Figs.

Manifold 10 includes substantially cylindrical sleeve 12 having a longitudinally extending flat 13 formed therein as perhaps best understood in connection with FIG. 2, and a distal free end that is externally threaded as at 14; threads 14 are discontinuous at flat 13 but such discontinuity does not defeat facile screw threaded engagement of said threads. The flat 13 gives sleeve 12 a "D" shape as shown in FIG. 2. The inflator that slidably receives sleeve 12 is complementally formed.

A frusto-conical section 16 at the proximal end of sleeve 12 interconnects sleeve 12 and cylindrical section 18 that has a slightly larger diameter than sleeve 12 as shown. However, section 16 need not be frusto-conical in configuration; it may be tubular.

Disc-shaped base member or flange 20 is integral to and concentrically aligned with section 18. A plurality of preferably eight apertures, collectively denoted 21, are formed about the circumferential extent of the flange, preferably in equidistantly and circumferentially spaced relation to one another and in radially arrayed relation to the longitudinal axis of symmetry 23 (FIG. 5) of manifold 10. Each aperture 21 may have a predetermined circumferential extent and thus an arcuate configuration as shown. However, each aperture 21 may be round, trapezoidal, or any other predetermined geometrical configuration. Apertures 21 may also be formed in open communication with the peripheral edge of flange 20.

A longitudinally extending slot or groove 22, best shown in FIG. 3, is formed in sleeve 12 in diametric opposition to flat 13. Groove 22 is in open fluid communication with a radially extending bore 24 that is also formed in diametric opposition to flat 13; bore 24 has its radially innermost end in open fluid communication with central passageway 26 defined by sleeve 12. Bore 24 is in open fluid communication with the distal end of sleeve 12.

A transverse band or groove 27 is formed in sleeve 12 and completely circumscribes it so that radial bore 24 need not be aligned in any particular position of rotational adjustment relative to an inflator, not shown. Specifically, it need not be aligned in diametric opposition to flat 13. Just as importantly, groove 22 is illustrated as having a limited longitudinal extent, but it should be understood that its longitudinal extent could be increased, thereby allowing radial bore 24 to communicate with the bore in the inflator even when the manifold and inflator are axially misaligned with respect to one another. Accordingly, groove 27 compensates for rotational and axial misalignment of bore 24 and the unillustrated inflator bore. Annular groove 27, longitudinally extending slot 22, and the novel positioning of radial bore 24 at the distal end of manifold 10 were all heretofore unknown in the art of inflation manifolds. Gaseous fluid from a punctured cartridge may enter transverse groove 27 unrestricted by the rotational or axial alignment of the manifold and inflator, and be channelled by said groove 27 to longitudinal groove 22 and be channeled by groove 22 to radial bore 24, and directed by said bore 24 into main passageway 26 of the manifold 10, and thus into the inflatable article.

Central or main passageway 26 has a first diameter at the distal free end of valve body 10; the diameter may be reduced proximally thereof, thereby defining an annular shoulder 25.

As best shown in FIGS. 2 and 5, a plurality of six or other predetermined plurality of longitudinally extending grooves or splines, collectively denoted 28, having a common dove-tailed contour when seen in end view or transverse section, are preferably formed in circumferentially and equidistantly spaced relation about the periphery of passageway 26.

As shown in FIG. 4, panel 30 of elastomeric material is thickened as at 32 to form a suitable mounting means for the proximal end of manifold 10. Aperture 34 is confluent with the interior cavity of an inflatable article defined by panel 30 and similar panels heat sealed, RF welded, or otherwise attached thereto. Aperture 34 is also in open fluid communication with central passageway 26.

To achieve the depicted (FIG. 4) embedding of the proximal or base end of the manifold 10 in thickened part 32, the elastomeric material is introduced into a mold within which manifold 10 is pre-positioned. Thus, the elastomeric material flows into the openings 21 from both sides, i.e., proximal and distal, thereof, thereby encasing flange 20 within said material when it hardens. As such, flange 20 becomes an integral part of the inflatable article and can not be pulled therefrom or rotated relative thereto without destroying the inflatable article itself. Moreover, as those skilled in the art of mold-making will appreciate, the elastomeric material will also flow into splines 28 (which begin at transverse plane 27 and which terminate at transverse plane 29 in FIG. 4), thereby further locking the manifold against rotation or axial displacement when the material hardens, because the elastomeric material in the splines is integral with the elastomeric material that encases the proximal end of manifold 10, as should be understood in connection with FIG. 4. Moreover, as apparent from FIG. 5, the splines 28 provide a gripping surface for the elastomeric material; without the traction provided by said splines the elastomeric material would slip when rotational forces were applied thereto, i.e., in the absence of splines 28, the sidewalls of main passageway 26 would be smooth and cylindrical.

The utility of the unique manifold will be appreciated by those skilled in this art. Perhaps more importantly, the specific manifold design shown and described herein was heretofore unknown, anywhere in the world.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A manifold apparatus for use with inflatable articles, comprising:
   an elongate cylindrical sleeve member having an unthreaded proximal end and a screw threaded distal end;

a central passageway being defined by said sleeve member;

a radially extending flange member being integrally formed with said proximal end of said sleeve member, said flange member circumscribing said sleeve member at said proximal end;

a plurality of spaced aperture being formed in said flange member; and a plurality of spaced apart spline members of predetermined geometrical configuration formed in said extending along said central passageway so that elastomeric material enters into said splines to further lock said manifold against rotation when said material hardens;

whereby said proximal end of said sleeve member and said flange member are pre-positioned in a mold so that elastomeric material introduced thereinto surrounds said proximal end and said flange member and fills said apertures and said spline members to make said flange member and said proximal end an integral part of an inflatable article formed by said elastomeric material.

2. The apparatus of claim 1, wherein each of said apertures has an acruate configuration of predetermined circumferential extent.

3. The apparatus of claim 1, wherein said predetermined geometrical configuration of said spline members is a dovetail configuration.

4. The apparatus of claim 1, further comprising a longitudinally extending flat formed in a wall defining an outer surface of said sleeve member, and a longitudinally extending groove formed in said wall of said sleeve member in substantial diametric opposition to said flat.

5. The apparatus of claim 4, further comprising a radially extending bore formed in said sleeve member, said bore providing fluid communication between said longitudinally extending groove and said central passageway.

6. The apparatus of claim 5, wherein said radially extending bore is in open fluid communication with said distal end of said sleeve member.

7. The apparatus of claim 6, further comprising a transverse groove member formed in said sleeve member in circumscribing relation thereto, said transverse groove member intersecting and being in fluid communication with said longitudinally extending groove.

8. The apparatus of claim 7, wherein said transverse groove member has a predetermined longitudinal extent.

* * * * *